United States Patent [19]

Oshiro et al.

[11] Patent Number: 4,922,755
[45] Date of Patent: May 8, 1990

[54] WRIST MECHANISM OF INDUSTRIAL ROBOT

[75] Inventors: Masayuki Oshiro, Funabashi; Fusaaki Kozawa, Chiyoda; Akira Uchida, Funabashi, all of Japan

[73] Assignee: Hitachi, Ltd., Tokyo, Japan

[21] Appl. No.: 288,145

[22] Filed: Dec. 22, 1988

[30] Foreign Application Priority Data

Dec. 28, 1987 [JP] Japan .................. 62-336088

[51] Int. Cl.$^5$ .................. B25J 17/02; G05G 11/00
[52] U.S. Cl. .................. 74/479; 901/23; 901/26; 901/29
[58] Field of Search .................. 74/479; 901/23, 28, 901/29

[56] References Cited

U.S. PATENT DOCUMENTS

| 4,586,868 | 5/1986 | Nakashima et al. | 901/26 X |
| 4,626,165 | 12/1986 | Nakashima et al. | 901/26 X |
| 4,636,138 | 1/1987 | Gorman | 901/26 X |

FOREIGN PATENT DOCUMENTS

| 0044548 | 1/1982 | European Pat. Off. . |
| 0105656 | 4/1984 | European Pat. Off. . |
| 0140659 | 5/1985 | European Pat. Off. . |
| 59-59390 | 4/1984 | Japan . |
| 87/07555 | 12/1987 | World Int. Prop. O. ........... 901/26 |

Primary Examiner—Allan D. Herrmann
Attorney, Agent, or Firm—Antonelli, Terry & Wands

[57] ABSTRACT

A wrist mechanism of an industrial robot is provided with a forearm, a wrist base mounted on the forearm so as to be rotatable about a lengthwise rotary axis of the forearm, a wrist body mounted on the wrist base so as to be swingable about a swing axis perpendicularly crossing the rotary axis of the wrist base, and a wrist top mounted on the wrist body so as to be rotatable about an axis perpendicular to the swing axis of the wrist body. The wrist base is characterized in that a motor for rotating the wrist tip and a motor for swinging the wrist body are arranged opposite to each other in a lengthwise direction.

6 Claims, 6 Drawing Sheets

WRIST MECHANISM OF INDUSTRIAL ROBOT

BACKGROUND OF THE INVENTION

This invention relates to a structure for miniaturizing a wrist of an industrial robot.

Figure 7:
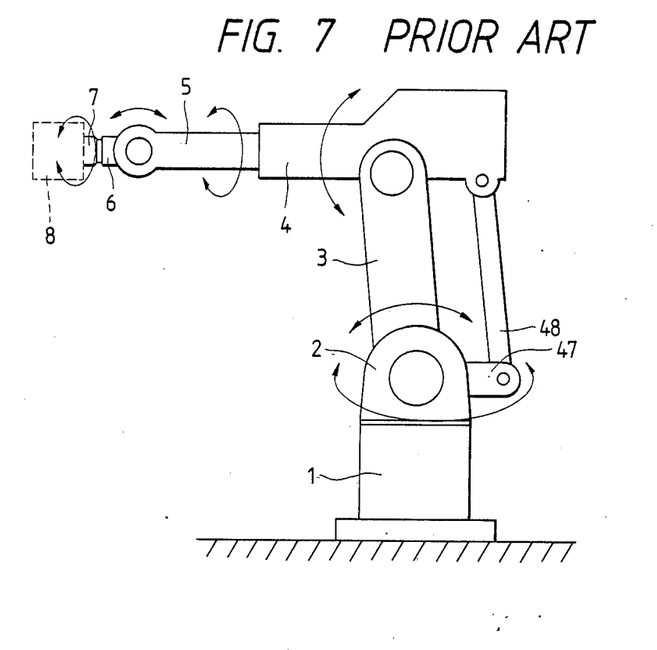
FIG. 7 is a diagram of the arm as a whole of a conventional industrial robot.

FIG. 7 is a schematic diagram of a conventional industrial robot. This industrial robot generally makes motions similar to ones of portions of a human body from the shoulder to the wrist.

In FIG. 7, a shoulder 2 is provided rotatably on a base 1. An upper arm 3 is mounted swingably on the free end portion of this shoulder. A forearm 4 is provided at the free end portion of the upper arm 3 so that the forearm 4 can swing with respect to the upper arm 3. The forearm 4 is driven via a forearm driving motor (no shown), a lever 47 and a driving link 48. A wrist base 5 is provided on a front portion of the forearm 4 so that the wrist base 5 can rotate around the longitudinal axis of the forearm 4. A wrist body 6 is provided on a front portion of the wrist base 5 so that the wrist body 6 can swing around a pivot extending at right angles to the axis around which the wrist base 5 rotates. A wrist tip 7 is provided on a front portion of the wrist body 6 so that the wrist tip 7 can be rotated around an axis extending at right angles to the wrist body-swinging pivot. Various kinds of instruments 8, such as a tool, a welding torch or a handling device are attached to the wrist tip to carry out various machining and processing operations. The above description is of the construction of a commonly used wrist of an industrial robot. There is also a wrist of an industrial robot, the construction of which is partially different from that of the abovementioned industrial robot wrist. For example, the wrist base-rotating axis, wrist body-swinging axis and wrist tip-rotating axis referred to in the above statement extend at substantially right angles. The angles of these axis do not necessarily cross each other at right angles and they can be regulated in accordance with the working posture.

Japanese Patent Laid-Open No. 59390/1984 discloses a construction of a conventional industrial robot wrist, as discussed above. According to the technique disclosed in this publication, motors for rotating a wrist tip and swinging a wrist body and reduction gears are provided within a wrist base so that this wrist can also be applied to a small-sized industrial robot.

According to the prior art disclosed in the above publication, however, the two motors in the wrist base are parallel-arranged so that each of them orients at right angles to the lengthwise axis of the wrist. Therefore, it is difficult to miniaturize a wrist which generally has an elongated structure of a columnar shape.

If these two motors are arranged so that they extend in the lengthwise direction of the wrist, the following problems which must be solved arise. (1) The transmitting of a driving force from a motor to a tip portion of the wrist is generally done by a belt (including a chain), which is generally extended in the lengthwise direction of the wrist in view of the necessity of miniaturizing the wrist. If these motors are arranged in this manner, it becomes necessary that the driving force from the lengthwise-arranged motors be transmitted to the belts after the direction of the driving force has been changed at right angles, so that the length of the driving force transmitting path increases. If the driving force transmitting path increases, the path along which an external force imparted to the tool at the free end of the wrist tip is transmitted also increases. This would cause the wrist to be displaced accordingly with ease, i.e., the rigidity thereof decreases. (2) If the two motors are arranged in the lengthwise direction of the wrist with no sufficient space left between the rear ends of the two motors and structural members of the wrist facing the rear ends, it becomes troublesome to take out the motors when the maintenance work for the wrist is carried out. Since the output shaft of a motor is generally meshed with a gear, the motor must be taken out by moving the motor in the axial direction thereof. However, when the length of the wrist is not set so large, the motor cannot be moved axially. In such a case, it is necessary that the motor be taken out by moving it in a direction perpendicular to the lengthwise axis thereof. This makes it necessary to disassemble the gear box meshed with the output shaft of this motor, so that the motor-removing operation becomes troublesome. Summary of the Invention An object of the present invention is to provide an industrial robot capable of being miniaturized by arranging a wrist tip-rotating motor and a wrist body-swinging motor in the lengthwise direction of the wrist, preventing a decrease in the rigidity of the wrist, and carrying out the maintenance work therefor with ease.

A wrist mechanism of an industrial robot according to the invention comprises a forearm, a wrist base provided rotatably around a lengthwise axis of the forearm, a wrist body provided swingably around a pivot or shaft (swing shaft) disposed perpendicularly to the lengthwise axis of the wrist base, a wrist tip portion provided rotatably around a rotary shaft perpendicular to the swing shaft around which the wrist body is swung, and the wrist base has a motor for rotating the rotary shaft and a motor for driving the swing shaft to cause the wrist body to swing around the swing shaft, those two motors being arranged opposite to each other in a lengthwise direction thereof.

DETAILED DESCRIPTION OF THE INVENTION

Figure 1:
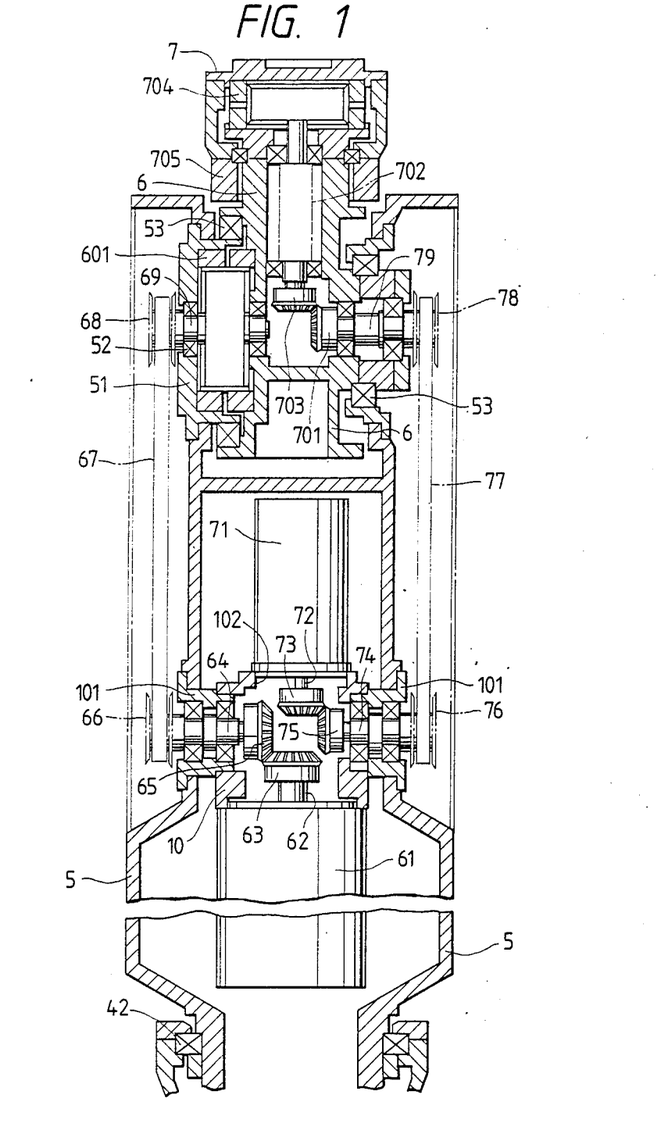
FIG. 1 is a sectional view of an embodiment of a wrist of an industrial robot according to the present invention.
Figure 2:
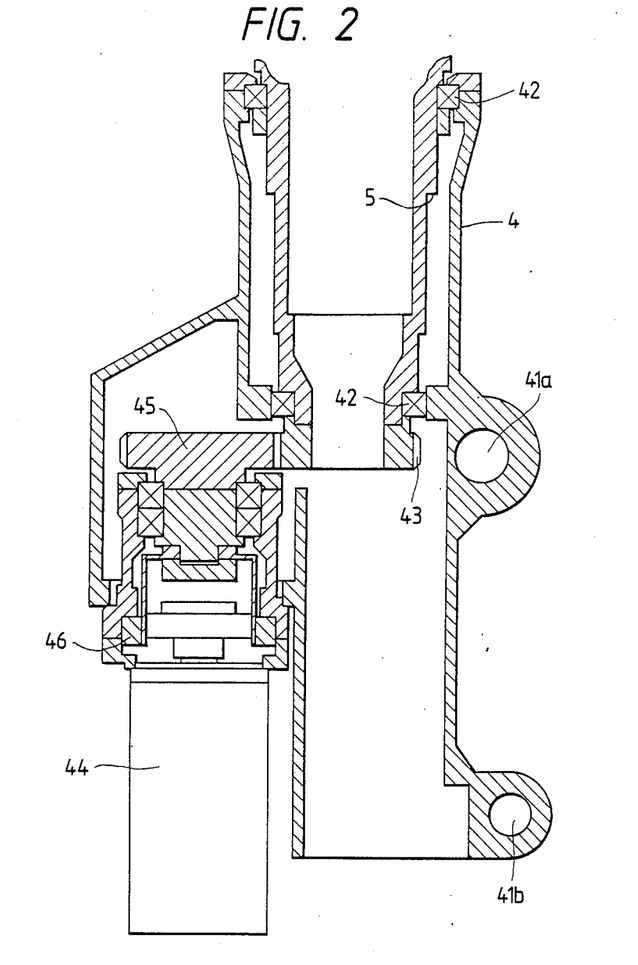
FIG. 2 is a sectional view, which continues from FIG. 1, of the forearm joined to the wrist of the robot.

An embodiment of the present invention will now be described with reference to FIGS. 1-4. FIGS. 1 and 2 constitute one drawing. An example of an industrial robot comprises a base, a shoulder rotatably mounted on the base, an upper arm swingably mounted on the shoulder, a forearm swingably mounted on the upper arm and a wrist mechanism rotatably mounted on a free end portion of the forearm. The base, shoulder, upper arm and forearm corresponds to ones of the conventional industrial robot shown in FIG. 7, respectively.

The wrist mechanism is installed with various kinds of tools to carry out various operation. The wrist mechanism comprises a wrist base 5 rotatably mounted on the forearm 4 around a lengthwise axis of the forearm 4, a wrist body 6 swingably mounted on the wrist base 5, and a wrist tip 7 rotatably mounted on the wrist body 6. The robot carries out various operation with the wrist tip 7 being installed with a tool. The forearm 4 shown in FIG. 2 is supported on an upper arm as shown in FIG. 7 by reference number 3 via a fulcrum 41a. The axial force of a driving link as shown in FIG. 7 by reference numeral 48 is transmitted to a fulcrum 41b, and the forearm 4 is swung around the fulcrum 41a. The rear portion of the wrist base 5 is housed rotatably in the interior of the forearm 4. The rear portion of this wrist base 5 is formed cylindrically and supported on a rotation supporting bearing 42 provided in the forearm 4. A gear 45 on the side of a motor 44 for rotation is meshed with a gear 43 formed on the rear end portion of the wrist base 5. The gear 45 on the side of the rotation motor 44 is connected to the same motor 44 via a harmonic final reduction gear 46.

A method of transmitting power to the wrist body 6, which is provided swingably with respect to the wrist base 5, will now be described with reference to FIG. 1. A motor 61 for swinging the wrist body 6 (referred to as swing motor) is provided in the interior of the wrist base 5 so as to extend in the lengthwise direction thereof. An output shaft 62 of the swing motor 61 faces in the forward direction, and is provided with a bevel gear 63 at the free end portion thereof. A bevel gear 65 is also mounted on a first transmission shaft 64 which extends at right angles to this output shaft 62, and these two shafts 62, 64 are connected at right angles via the bevel gears 63, 65. A pulley 66 is mounted on the other end portion of the first transmission shaft 64, and a belt 67 is engaged with this pulley 66. This belt 67 runs in the lengthwise direction of the wrist base, and is engaged with an opposite pulley 68. This pulley 68 is mounted on a swing shaft 69 around which swing is effected, which shaft is supported on a bearing 52 provided in a housing 51 of the wrist base 5. A harmonic final reduction gear 601 is connected with this shaft 69, and the wrist body 6 is supported on a shaft support bearing 53 via this reduction gear so that the wrist body can be swung. The axis of this shaft 69 extends at right angles to the axis around which the wrist base 5 is turned.

A method of transmitting power to the wrist tip 7 which is provided rotatably with respect to the wrist body 6 will now be described. A rotation motor 71 for rotating the wrist tip 7 is provided in opposition to the swing motor 61 in the wrist base 5 so as to extend in the lengthwise direction thereof. An output shaft 72 of this motor 71 has at its free end portion a bevel gear 73 meshed with a bevel gear 75 mounted on a second transmission shaft 74 which extends at right angles to the output shaft 72, and these two shafts 72, 74 are connected to each other at right angles. The second transmission shaft 74 is provided at the other end portion thereof with a pulley 76 with which a belt 77 is engaged. The belt 77 runs in parallel with the above-mentioned belt 67 in the forward direction in the interior of the wrist base 5. A pulley 78, the other pulley around which this belt 77 is passed, is mounted on a third transmission shaft 79. This third transmission shaft 79 is positioned in parallel with the second transmission shaft 74. The third transmission shaft 79 is provided at its inner end portion with a bevel gear 701, which is meshed with a bevel gear 703 mounted on a rotary shaft 702. The two shafts 79, 702 extend at right angles to each other. The wrist tip 7 is mounted on the front end portion of the rotary shaft 702 via a harmonic final reduction gear 704. The wrist tip 7 is supported on a rotary movement supporting bearing 705 and rotated.

The axes of the shaft 69 and third transmission shaft 79 are aligned with each other, and these aligned axes and the axis of the rotary shaft 702 cross at right angles. The axes of the first and second transmission shafts 64, 74 are also aligned with each other, and a gear box 10, which is described later, can be turned around these aligned axes.

Figure 3:
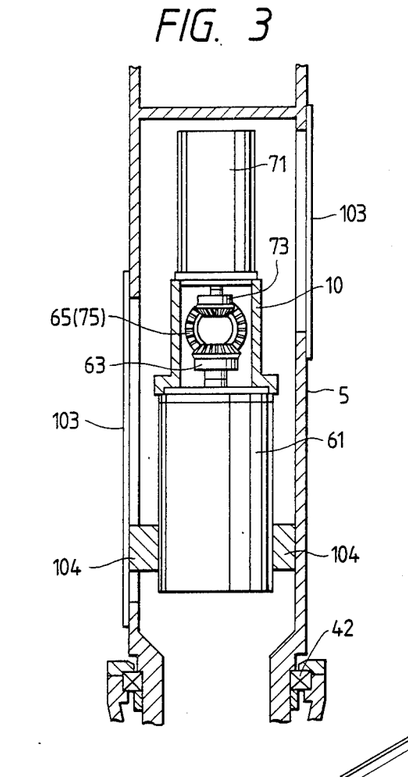
FIG. 3 is a sectioned side elevation of what is shown in FIG. 1.

The two output shafts 62, 72, two transmission shafts 64, 74 and bevel gears 63, 65, 73, 75 mounted on these output shafts are housed in the single gear box 10, which can be turned with respect to a bearing housing 101 for the first and second transmission shafts 64, 74. The turning movement of the gear box 10 is normally prevented by a motor holder 104 as shown in FIG. 3. The turning of the gear box 10 is done so as to carry out a maintenance inspection operation easily. The gear box 10 is provided with an opening 102 through which the output shafts 62, 72 of the motors extend. This opening 102 is made so large that the bevel gears 63, 73 mounted on the free end portions of the output shafts 62, 72 can be passed therethrough.

The operation of this embodiment will now be described briefly. When the rotation driving motor 44 is energized, the wrist base 5 is turned with respect to the forearm 4. This turning movement is made around the lengthwise axis of the forearm 4. When the swing motor 61 is energized as the wrist base 5 is turned, the wrist body 6 is swung. This swinging movement is made around the shaft 69, which extends at right angles to the axis around which the wrist base is turned. When the motor 71 is energized as the wrist body 6 is swung, the wrist tip 7 is rotated. Accordingly, the wrist of this industrial robot has three degrees of freedom. A tool is attached to the free end of this wrist tip, whereby machining and processing operations are carried out.

Figure 4:
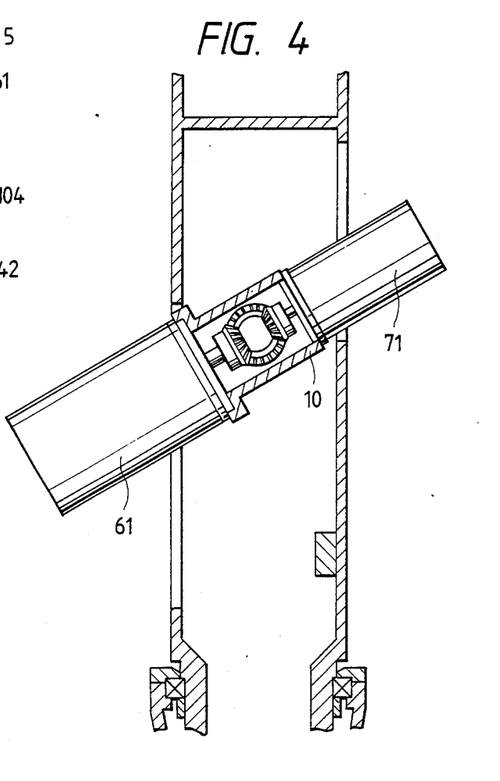
FIG. 4 is a sectional view for explaining an operation of the portion of the wrist which is shown in FIG. 3.

The maintenance work will now be described. FIG. 3 is a side elevation of what is shown in FIG. 1, and FIG. 4 illustrates an operation of the portion of the embodiment which is shown in FIG. 3. When it is necessary to take out the two motors 61, 71 during a maintenance operation, a cover 103 for the wrist base 5 is removed first, and then the motor holder 104, the gear box 10 being then turned around the bearing housing 101. The gear box 10 is turned with the two motor 61, 71 fixed thereto. This turning movement is made around the aligned axes of the first and second transmission shafts 64, 74.

During this time, relative movement occurs between the bevel gears 63, 65; 73, 75 which are meshed with each other. Since brakes are generally provided in these two motors 61, 71, relative rotating movements occur in the free bevel gear 65, 75 positioned on the driven side. Since the angles of such rotating movements of the bevel gears are not more than 90°, and since the speeds of the same movements are reduced (to, for example, around 1/50-1/100) by the harmonic final reduction gears 601, 704 installed at the terminal ends on the power transmission paths, the angles of rotating movement of the wrist body 6 and wrist tip 7 constituting driven members are very small, i.e., the wrist body 6 and wrist tip 7 are not rotated until they contact the mechanical stoppers. The meshing condition of the pairs of gears 63, 65; 73, 75 does not change. Namely, the bevel gears are not pressed against each other, nor they are disengaged from each other. Accordingly, if the gear box 10 and motors 61, 71 are turned back to the original positions, the positions of the driven members, i.e. the wrist body 6 and wrist tip 7 can be restored.

In order to remove motors 61, 71 from the gear box 10, the gear box 10 is turned. The motors 61, 71 are then ready to be taken out easily from the opening 102 with the bevel gear 63 on the output shaft 62 and the bevel gear 73 on the output shaft 72 attached to the motors 61, 71. This means that it is unnecessary to draw back the first and second transmission shafts 64, 74 in the axial directions thereof for disengaging the bevel gears thereon from those on the output shafts. Accordingly, it is also unnecessary to remove the belts 67, 77 from the pulleys 66, 76. Thus, the motors or detectors (position detectors or speed detectors) provided in the rear end portions of the motors are allowed to project to the outer side of the wrist base 5, and the motors can be removed. This enables the maintenance, inspection and replacement of the parts to be carried out easily.

According to the present invention, the motors in the wrist are arranged in the lengthwise direction thereof, so that the wrist can be miniaturized. Since the paths of transmitting the power from the motors are at right angles, the lengths of the power transmission paths increase due to the first and second transmission shafts 64, 74 which are part of these paths. However, the increase in the rigidity of the wrist, which is caused by the increase in the lengths of these transmission paths, can be minimized by providing the harmonic final reduction gears 601, 704 at the terminal ends of the transmission paths. Since the two motors are arranged in an opposed state, only one gear box for housing them need be provided. Moreover, since this gear box is formed so that it can be turned around the aligned axes of the first and second transmission shafts, the two motors are allowed to project or can be removed from the wrist base during the maintenance work without disassembling the gear box. This enables the maintenance work to be carried out easily.

Figure 5:
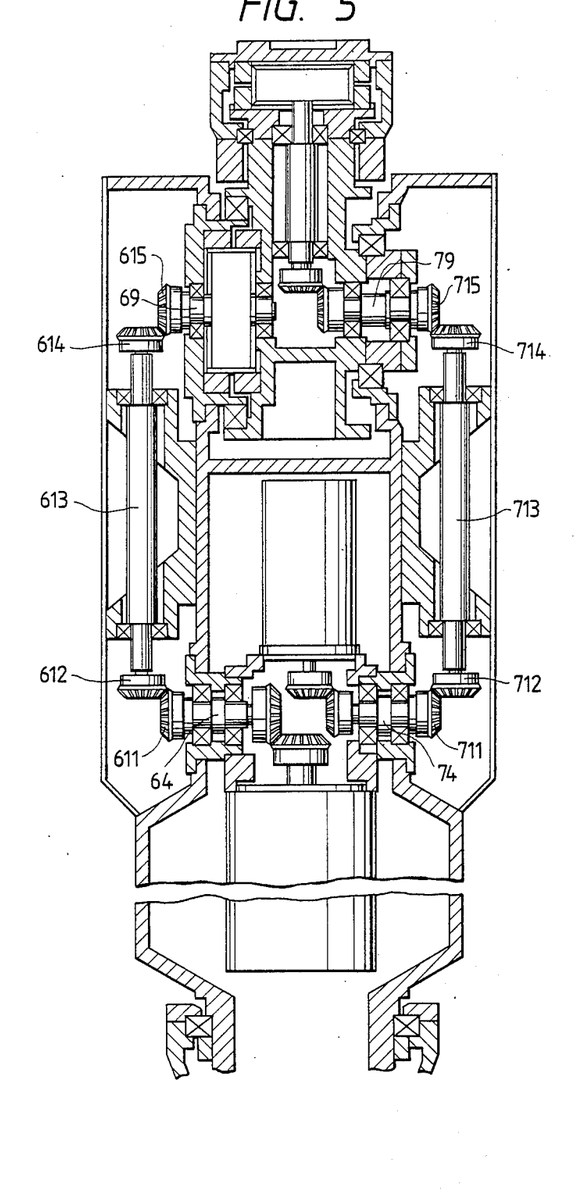
FIG. 5 is a sectional view of another embodiment of a wrist according to the present invention.

Next, another embodiment, wherein a power transmitting method is different in part from a method of transmitting power to the wrist body 6 swingably mounted on the wrist base 5 and to the wrist tip portion 7 rotatably mounted on the wrist body 6 as explained in FIG. 1, will be described referring to FIG. 5. The present embodiment is the same in operation and effects of the invention as ones of the previously mentioned embodiment.

In the embodiment illustrated in FIGS. 1 to 4, the belt 67 and pulley 68 are used as a power transmitting means from the first transmitting shaft 64 to the swing shaft 69. In this embodiment, the first transmission shaft 64 is connected to the swing shaft 69 through a fourth transmission shaft 613 and bevel gears 611, 612, 614 and 615. Namely, the first transmission shaft 64 has the bevel gear 612 at a tip thereof and is connected to the fourth transmission shaft, which is perpendicular to the first transmission shaft 64, through the bevel gear 612 mounted on one end of the fourth transmission shaft 613. The fourth transmission shaft 613 has the bevel gear 614 at the other end thereof and is connected to the swing shaft 69 through the bevel gear 614 which is meshed with the bevel gear 615 mounted on the swing shaft 69.

Further, power transmission between the second transmission shaft 74 and the third transmission shaft 79 also is effected in a similar manner. Namely, the second transmission shaft 74 has a bevel gear 711 at its tip, and the bevel gear 711 is meshed with a bevel gear 712 mounted on one end of a fifth transmission shaft 713 disposed perpendicularly to the second transmitting shaft 713. The fifth transmission shaft 713 has, at the other end thereof, another bevel gear 714 which is meshed with a bevel gear 715 of the third transmission shaft 79 perpendicular to the fifth transmission shaft 713, thereby connecting the third and fifth transmission shafts 79 and 713.

Figure 6:
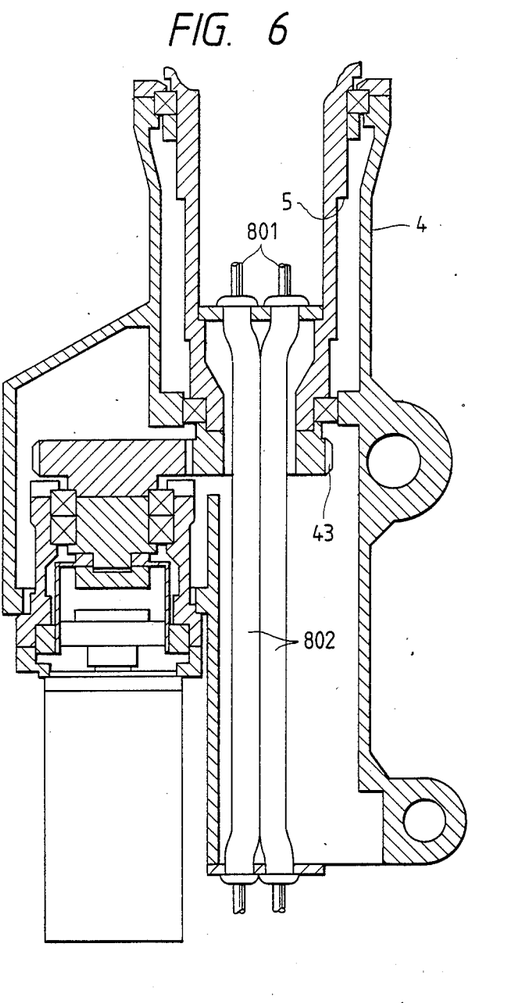
FIG. 6 is a sectional view of a part of a wrist according to another embodiment of the present invention.

Next, a method of connecting electric wires both to the motor 71 and the motor 61 within the wrist base 5 is described referring to FIG. 6.

The electric wires 801 are surrounded by flexible pipes 802, respectively. One end of each electric wire 801 is fixed to the wrist base 5 and connected to the motors 71, 61. The other end of each wire 801 is fixed to the forearm 4.

The electric wires 801 pass through a hole which is formed in a gear 43 so as to be concentric with the wrist base 5.

The electric wires 801 are provided along a central axis of the wrist base 5, so that the wires are twisted as the wrist base rotates. Deformation caused in the electric wire 801 is mainly one caused by twisting. The wires are easily deformed, so that they are not easily damaged.

What is claimed is:

1. A wrist mechanism of an industrial robot comprising a forearm, a wrist base mounted on said forearm so as to be rotatable about a lengthwise axis of said forearm, a wrist body mounted on said wrist base as to be swingable about an axis of a swing shaft which perpendicularly crosses the lengthwise axis of said wrist body and is provided for swinging said wrist body thereabout, and a wrist tip mounted on said wrist body so as to be rotatably about a rotary shaft perpendicular to the swing shaft axis of said wrist body, wherein an output shaft of a rotation motor provided for rotating said wrist tip and an output shaft of a swing motor provided for swinging said wrist body are arranged oppositely to each other in a lengthwise direction thereof.

2. A wrist mechanism of an industrial robot as defined in claim 1, wherein said output shaft of said swing motor is connected to a first transmission shaft perpendicular to said output shaft by a pair of bevel gears, said first transmission shaft being connected, through means for transmitting power, to said swing shaft on which said wrist body is mounted to be swingable through a gear, said output shaft of said rotation motor is connected to a second transmission shaft by a pair of bevel gears, said second transmission shaft being perpendicular to said output shaft of said rotation motor and connected, through means for transmitting power, to said rotary shaft on which said wrist tip is mounted through a reduction gear.

3. A wrist mechanism of an industrial robot as defined in claim 2, wherein said output shaft of said rotation motor and said output shaft of said swing motor are accommodated in a single gear box, said gear box being provided turnably about axes of said first and second transmission shafts, which axes are aligned.

4. A wrist mechanism of an industrial robot comprising a forearm, a wrist base mounted on said forearm so as to be rotatable about a lengthwise axis of said forearm, a wrist body mounted on said wrist base so as to be swingable about an axis of a swing shaft which perpendicularly crosses the lengthwise axis of said wrist body and is provided for swinging said wrist body thereabout, and a wrist tip mounted on said wrist body so as to be rotatable about a rotary shaft perpendicular to the swing shaft axis of said wrist body, characterized in that a rotation motor provided for rotating said wrist tip and a swing motor provided for swinging said wrist body are arranged oppositely to each other in a lengthwise direction thereof and disposed within said forearm.

5. A wrist mechanism of an industrial robot according to claim 4, wherein said rotation motor and said swing motor are mounted on a single gear box so that an output shaft of said rotation motor and an output shaft of said swing motor oppose each other, said gear box being fixed to said forearm through bearing housings.

6. A wrist mechanism of an industrial robot according to claim 5, wherein said rotational axes of said output shafts of said rotation motor and said swing motor are in a lengthwise direction of said forearm, said rotation motor rotating said wrist tip through a second transmission mechanism including a second transmission shaft rotatably supported by one of said bearing housings and said swing motor swinging said wrist body through a first transmission mechanism including a first transmission shaft rotatably supported by the other bearing housing.

* * * * *